United States Patent
Kim et al.

(10) Patent No.: US 10,354,120 B2
(45) Date of Patent: Jul. 16, 2019

(54) SENSOR FOR INCREASING SECURITY USING BIOMETRIC DATA, MOBILE DEVICE INCLUDING THE SAME, AND AUTHENTICATION METHOD OF THE MOBILE DEVICE

(71) Applicant: Samsung Electronics Co., Ltd., Suwon-si, Gyeonggi-do (KR)

(72) Inventors: Sun Kwon Kim, Yongin-si (KR); Hyung Jong Ko, Seongnam-si (KR); Seong Il Park, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 141 days.

(21) Appl. No.: 15/471,269

(22) Filed: Mar. 28, 2017

(65) Prior Publication Data
US 2017/0286748 A1    Oct. 5, 2017

(30) Foreign Application Priority Data

Mar. 29, 2016   (KR) .................. 10-2016-0037934

(51) Int. Cl.
*G06K 9/00*    (2006.01)

(52) U.S. Cl.
CPC ..... *G06K 9/00107* (2013.01); *G06K 9/00087* (2013.01); *G06K 9/00892* (2013.01); *G06K 9/00899* (2013.01); *G06K 2009/00939* (2013.01)

(58) Field of Classification Search
CPC ........... G06K 9/00892; G06K 9/00087; G06K 9/00107; G06K 9/00899; G06K 2009/00939; G06K 19/0718
USPC ........................................................ 382/124
See application file for complete search history.

(56) References Cited

U.S. PATENT DOCUMENTS

| | | | |
|---|---|---|---|
| 7,907,754 B2 | 3/2011 | Niinuma et al. | |
| 8,014,192 B2 | 9/2011 | Phillips et al. | |
| 8,073,204 B2 | 12/2011 | Kramer et al. | |
| 9,038,167 B2 | 5/2015 | Fadell et al. | |
| 2006/0156028 A1* | 7/2006 | Aoyama | G07C 9/00142 713/186 |
| 2010/0113952 A1* | 5/2010 | Raguin | G06K 9/0012 600/509 |
| 2011/0257546 A1* | 10/2011 | Gozzini | A61B 5/0404 600/509 |

(Continued)

FOREIGN PATENT DOCUMENTS

| | | | |
|---|---|---|---|
| JP | 2005006824 A | 1/2005 | |
| JP | 2007179434 A | 7/2007 | |

(Continued)

*Primary Examiner* — Daniel G Mariam

(74) *Attorney, Agent, or Firm* — Harness, Dickey & Pierce, P.L.C.

(57) ABSTRACT

A sensor for increasing security using biometric data, a mobile device including the same, and an authentication method of the mobile device are provided. The sensor includes a fingerprint sensor configured to detect fingerprint data of a user contacting a fingerprint acquisition region, a plurality of electrodes, and a bio sensor connected to the electrodes to detect at least one type of biometric data. A first electrode among the electrodes is located such that a finger of the user contacts the first electrode when the finger of the user is in contact with the fingerprint acquisition region.

19 Claims, 12 Drawing Sheets

(56) References Cited

U.S. PATENT DOCUMENTS

| | | |
|---|---|---|
| 2015/0146944 A1 | 5/2015 | Pi et al. |
| 2015/0173632 A1* | 6/2015 | Ma et al. |
| 2016/0246396 A1* | 8/2016 | Dickinson ............ G06F 3/03545 |
| 2016/0283703 A1* | 9/2016 | Allyn ........................ G06F 21/32 |
| 2017/0119307 A1* | 5/2017 | Shim ................. H04M 1/72522 |

FOREIGN PATENT DOCUMENTS

| | | |
|---|---|---|
| JP | 2007325842 A | 12/2007 |
| JP | 2008073461 A | 4/2008 |
| JP | 2008073462 A | 4/2008 |
| JP | 2009003492 A | 1/2009 |
| KR | 0995668 | 11/2010 |
| KR | 1258203 | 4/2013 |
| KR | 1270954 | 5/2013 |
| KR | 1511916 | 4/2015 |

* cited by examiner

SENSOR FOR INCREASING SECURITY USING BIOMETRIC DATA, MOBILE DEVICE INCLUDING THE SAME, AND AUTHENTICATION METHOD OF THE MOBILE DEVICE

CROSS-REFERENCE TO RELATED APPLICATIONS

This application claims priority under 35 U.S.C. § 119(a) from Korean Patent Application No. 10-2016-0037934 filed on Mar. 29, 2016, the disclosure of which is hereby incorporated by reference in its entirety.

BACKGROUND

Example embodiments of inventive concepts relate to a sensor and/or a mobile device including the same, such as a sensor for increasing security using biometric data, a mobile device including the same, and/or an authentication method of the mobile device.

With the increase of electronic commerce using a mobile device or an internet, authentication for financial transactions or personal information is frequently used. A fingerprint sensor is frequently used for authentication. An optical fingerprint sensor, an ultrasonic fingerprint sensor, and a semiconductor fingerprint sensor have been studied for a finger scan sensor used in security and authentication systems.

The optical fingerprint sensor acquires a fingerprint image using total reflection of light input from a light source to a prism.

The ultrasonic fingerprint sensor senses a fingerprint using ultrasonic waves and is able to sense not only the surface (i.e., outer layer) of skin but also the inner skin below the outer layer.

A capacitive sensor, one of semiconductor fingerprint sensors, senses a fingerprint by a difference in capacitance which occurs when a fingerprint contacts a sensing electrode.

Anti-spoofing technology is used to prevent spoofing using a fake fingerprint when a fingerprint sensor is used for security and authentication. Spoofing is a sort of hacking. When a malicious user passes through authentication and accesses security information or gets permission to do a financial transaction, it may also be called spoofing.

SUMMARY

According to at least some example embodiments of inventive concepts, there is provided a sensor including a fingerprint sensor configured to detect fingerprint data of a user contacting a fingerprint acquisition region, a plurality of electrodes, and a bio sensor connected to the electrodes to detect at least one type of biometric data. A first electrode among the electrodes is located such that a finger of the user when the finger of the user contacts the first electrode when the user's finger is in contact with the fingerprint acquisition region.

According to other example embodiments of inventive concepts, there is provided a mobile device including a fingerprint sensor configured to detect fingerprint data of a user contacting a fingerprint acquisition region, the fingerprint acquisition region having a circuit configured to acquire the user's fingerprint, a plurality of electrodes, a bio sensor connected to the electrodes to detect at least one type of biometric data, and a processor configured to execute computer-readable instructions to control the bio sensor and the fingerprint sensor.

According to further example embodiments of inventive concepts, there is provided an authentication method of a mobile device including a fingerprint sensor and a bio sensor. The authentication method includes selecting one mode between a first authentication mode and a second authentication mode, the first authentication mode using only the fingerprint sensor of the fingerprint sensor and the bio sensor and the second authentication mode using both the fingerprint sensor and the bio sensor, authenticating a user by enabling the fingerprint sensor and disabling the bio sensor and comparing fingerprint data detected by the fingerprint sensor with reference fingerprint data in the first authentication mode, and authenticating the user by enabling both the fingerprint sensor and the bio sensor and comparing the fingerprint data detected by the fingerprint sensor with the reference fingerprint data and biometric data detected by the bio sensor with reference biometric data in the second authentication mode.

In other example embodiments of inventive concepts, an authentication device includes a fingerprint sensor configured to detect fingerprint data of a user contacting a fingerprint acquisition region, a plurality of electrodes and a bio sensor connected to the electrodes to detect at least one type of biometric data. The plurality of electrodes are arranged to form a closed loop with a user upon being contacted by the user.

BRIEF DESCRIPTION OF THE DRAWINGS

The above and other features and advantages of inventive concepts will become more apparent by describing in detail example embodiments thereof with reference to the attached drawings in which.

DETAILED DESCRIPTION OF EXAMPLE EMBODIMENTS

Figure 1:
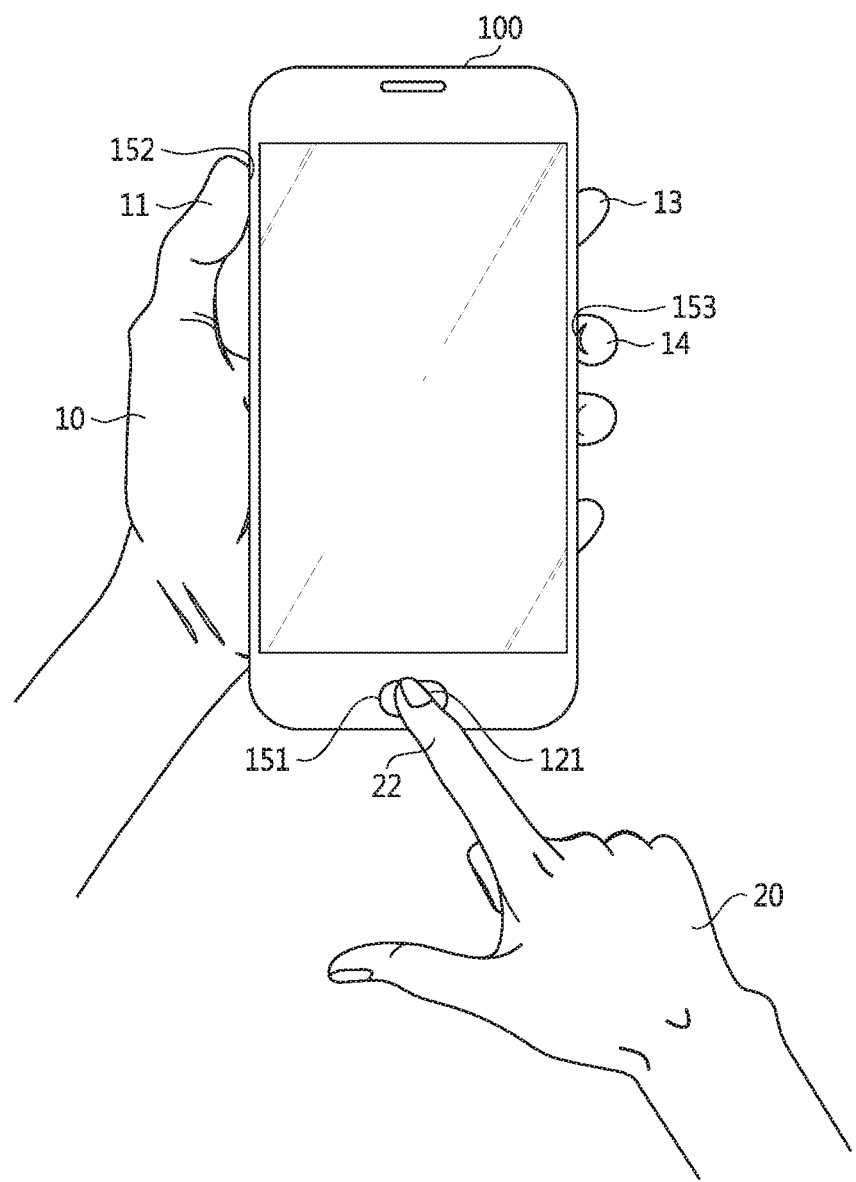
FIG. 1 is a diagram of an exterior of an authentication device according to some example embodiments of inventive concepts.

FIG. 1 is a diagram of an exterior of an authentication device 100 according to some example embodiments of inventive concepts. FIG. 2A is a front view of the authentication device 100 according to some example embodiments of inventive concepts. FIG. 2B is a left side view of the authentication device 100 according to some example embodiments of inventive concepts. FIG. 2C is a right side view of the authentication device 100 according to some example embodiments of inventive concepts. FIG. 2D is a rear view of the authentication device 100 according to some example embodiments of inventive concepts.

Figure 2:
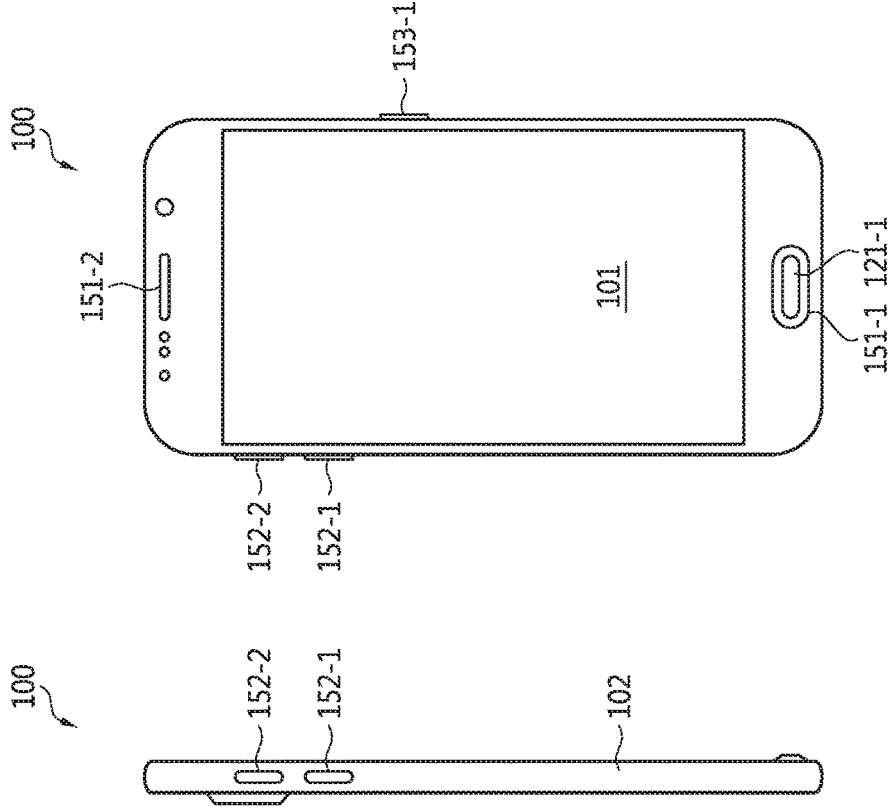
FIG. 2A is a front view of the authentication device according to some example embodiments of inventive concepts.
FIG. 2B is a left side view of the authentication device according to some example embodiments of inventive concepts.
FIG. 2C is a right side view of the authentication device according to some example embodiments of inventive concepts.
FIG. 2D is a rear view of the authentication device according to some example embodiments of inventive concepts.

Referring to FIGS. 1 through 2D, the authentication device 100 may be implemented as a mobile device such as a smart phone, a tablet personal computer (PC), a personal digital assistant (PDA), an enterprise digital assistant (EDA), a mobile internet device (MID), or an e-book, but inventive concepts are not restricted to these examples. The authentication device 100 may also be an internet of things (IoT) device. The IoT device may include an accessible interface (e.g., a wired interface or a wireless interface). The IoT device may refer to a device which can communicate (e.g., transmit and receive data via wired or wireless connection) with at least one electronic device (or another IoT device) using the accessible interface.

The accessible interface may include a local area network (LAN), a wireless LAN (WLAN) like wireless fidelity (Wi-Fi), a wireless personal area network (WPAN) like Bluetooth, a wireless universal serial bus (USB), Zigbee, near field communication (NFC), radio-frequency identification (RFID), or a mobile cellular network, but inventive concepts are not restricted to these examples. The mobile cellular network may include a third generation (3G) mobile cellular network, a fourth generation (4G) mobile cellular network, a long term evolution (LTE™) mobile cellular network, or an LTE-advanced (LTE-A) mobile cellular network, but inventive concepts are not restricted to these examples.

The authentication device 100 may include a sensor 110 (shown in FIG. 5), a fingerprint acquisition region 121, and a plurality of electrodes 151, 152, and 153. The fingerprint acquisition region 121 may be connected to a fingerprint sensor 120 which recognizes a fingerprint or may be formed as a part of the fingerprint sensor 120. In other words, the fingerprint acquisition region 121 may be formed inside or outside the fingerprint sensor 120. The electrodes 151, 152, and 153 may be connected to a bio sensor 130 which detects biometric data. The sensor 110, which is embedded in the authentication device 100 and includes the fingerprint sensor 120 and the bio sensor 130, will be described in detail with reference to FIGS. 5 through 8 later.

In the example embodiments illustrated in FIG. 1, the electrode 151 is placed at the front of the authentication device 100, the electrode 152 is placed at the left side of the authentication device 100, and the electrode 153 is placed at the right side of the authentication device 100; but the positions and number of the electrodes 151, 152, and 153 are not restricted to those shown. The electrodes 151, 152, and 153 are respectively referred to as first, second and third electrodes.

The fingerprint sensor 120 recognizes a user's fingerprint contacting the fingerprint acquisition region 121. Everyone's fingerprints are unique, so that an individual can be identified and authenticated using fingerprint recognition. The fingerprint sensor 120 may be a contact or contactless sensor. For the sake of brevity, the fingerprint sensor 120 may be a contact fingerprint sensor in the description below.

The fingerprint acquisition region 121 is configured to acquire a fingerprint of a target of authentication (hereinafter, referred to as a "user"). It is a region which a particular portion of a user's finger, which has been registered in advance, is made to be in contact with. The fingerprint acquisition region 121 may be positioned at the front of the authentication device 100, but inventive concepts are not restricted thereto.

The fingerprint sensor 120 is connected with the fingerprint acquisition region 121 and may detect a user's fingerprint contacting the fingerprint acquisition region 121. The fingerprint sensor 120 may transmit detected fingerprint data to a processor (210 in FIG. 5 or 6) of the authentication device 100. The fingerprint sensor 120 may compare the detected fingerprint with a registered fingerprint that has been stored in advance, make a decision about the sameness between the detected fingerprint and the registered fingerprint, and transmit a decision result to the processor 210 of the authentication device 100. The inner structure of the authentication device 100 including the processor 210 will be described with reference to FIGS. 5 and 6 later.

The authentication device 100 may also detect biometric data. The biometric data may include an electrocardiograph (ECG), a photoplethysmogram (PPG), a human body fat, a body temperature, and a heart rate, but inventive concepts are not restricted to these examples.

Figure 3:
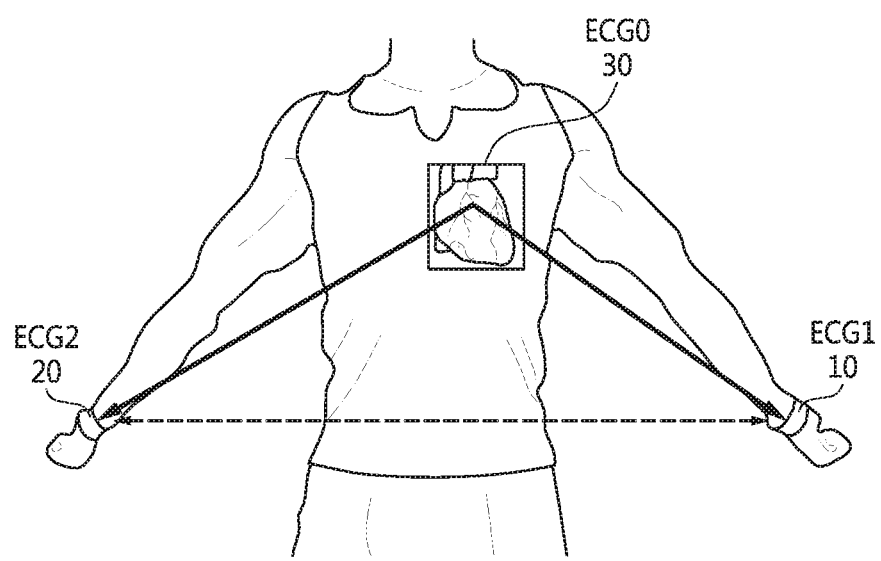
FIG. 3 is a diagram for explaining the measurement of an electrocardiograph (ECG)
Figure 4:
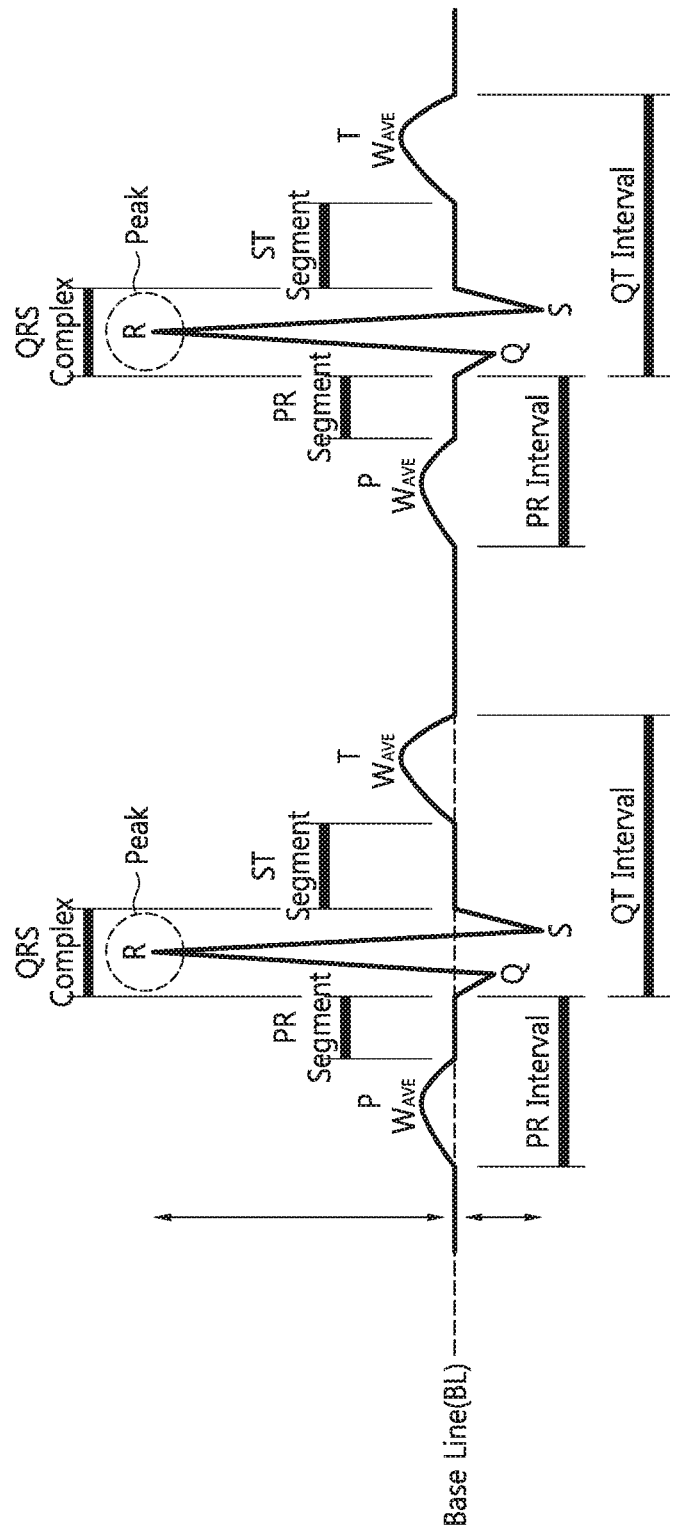
FIG. 4 is a graph illustrating ECG data measured according to some example embodiments of inventive concepts.

FIG. 3 is a diagram for explaining the measurement of an ECG. FIG. 4 is a graph illustrating ECG data measured according to some example embodiments of inventive concepts. Referring to FIGS. 3 and 4, a closed loop including a heart 30 needs to be formed to measure an ECG. Accordingly, a user's left hand 10 and right hand 20 need to be in contact with the authentication device 100 at the same time.

Referring to FIG. 4, ECG data includes a heart rate, a PR interval, a QT interval, a PR segment, an ST segment, and a peak R. The PR interval is a period from the start of a P wave till a QRS complex. The QT interval is a period from the start of the QRS complex to the end of a T wave. The PR segment is a period from the end of the P wave to the start of the QRS complex. The ST segment is a period from the end of the QRS complex to the start of the T wave.

Everyone has unique ECG data. Accordingly, an individual can be identified and authenticated by biometric data such as ECG data. Differently from fingerprint data, biometric data may confirm "liveness" of a user (i.e., a target of authentication). Accordingly, when fingerprint data and biometric data are used together, security and defense against a fake fingerprint can be increased.

Meanwhile, recognition time for biometric data may be longer than recognition time for fingerprint data. The biometric data may be a bioelectrical impedance analysis (BIA) signal or a galvanic skin response (GSR) signal. BIA is a commonly used method for estimating body composition, and in particular, body fat. For BIA or to measure a BIA signal, four electrodes may be needed. Accordingly, a fourth electrode may be additionally provided apart from the first through third electrodes 151 through 153 illustrated in FIG. 1. In addition, a current source having a frequency of 50 kHz through 1 MHz may also be provided to measure a BIA signal. The bandwidth of the BIA signal may be 50 kHz through 1 MHz but is not restricted thereto.

The bio sensor 130 may sense or measure a biological signal using a plurality of electrodes, i.e., the electrodes 151 through 153. Each of the electrodes 151 through 153 may be formed of a conductive material or implemented as a conductive patch. The first electrode 151 may be configured to be in contact with a user at the same time as the fingerprint acquisition region 121 is in contact with the user. In other words, the first electrode 151 may be positioned at or near the fingerprint acquisition region 121 so that the first electrode 151 is in contact with a user's particular finger when the user's particular finger is in contact with the fingerprint acquisition region 121.

Referring to FIGS. 1 through 2D, when a user lets an index finger 22 of the right hand 20 come into contact with the fingerprint acquisition region 121 positioned at the front of the authentication device 100 while holding the authentication device 100 with the left hand 10, the first electrode 151 positioned in close vicinity to the fingerprint acquisition region 121 is also touched. Meanwhile, the user may press the second electrode 152 with a thumb 11 of the left hand 10 holding the authentication device 100 and press the third electrode 153 with an index finger 13 or a middle finger 14 of the left hand 10.

The first electrode 151 may be used as a positive electrode, the second electrode 152 may be used as a negative electrode, and the third electrode 153 may be used as a reference electrode; but inventive concepts are not restricted thereto. The reference electrode may be connected to the ground. When a user is in contact with both the fingerprint acquisition region 121 and the first electrode 151 with one hand and comes into contact with at least one electrode (e.g., the electrodes 152 and 153) with the other hand while holding the authentication device 100 with the other hand, the closed loop including the heart 30 is formed, as shown in FIG. 3.

The electrodes 151 through 153 may be used to detect fine electrical changes on the skin produced by heart muscle depolarization during each heart bit. The number and positions of the electrodes 151 through 153 may be variously modified in different embodiments. For instance, the first electrode 151 may be formed at a position 151-1 in FIG. 2A at the lower front of the authentication device 100 or at a position 151-2 in FIG. 2A at the upper front of the authentication device 100. The second electrode 152 may be formed at a position 152-1 or 152-2 in FIG. 2B at a left side 102 of the authentication device 100. The third electrode 153 may be formed at a position 153-1 or 153-2 in FIG. 2C at a right side 103 of the authentication device 100. At least one of the electrodes 151 through 153 may be formed at a position 151-3 in FIG. 2D at a rear 104 of the authentication device 100. The fingerprint acquisition region 121 may be formed at a position at the front of the authentication device 100 or a position 121-3 in FIG. 2D at the rear 104.

Figure 5:
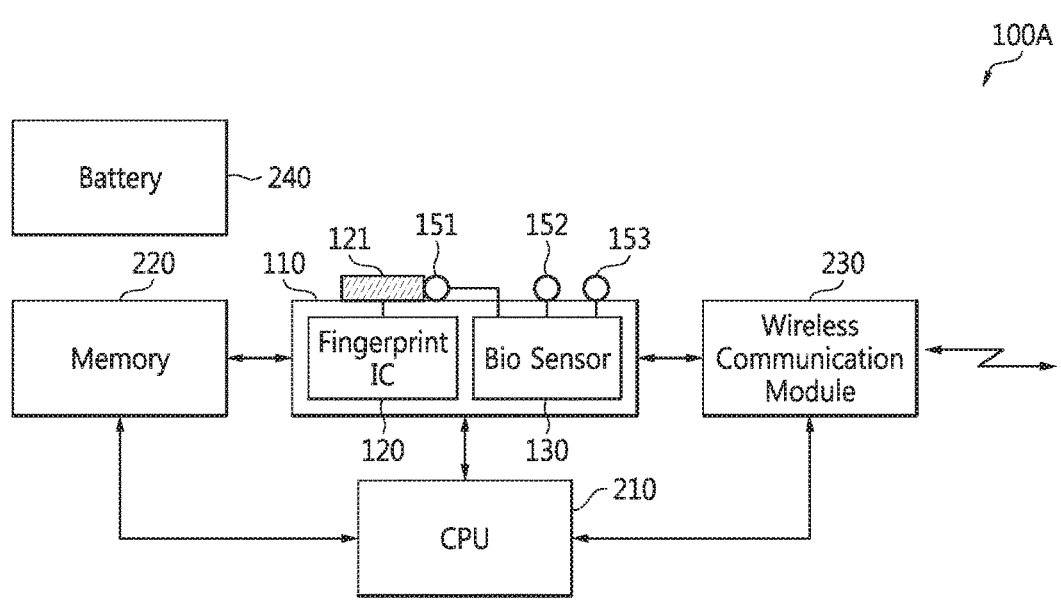
FIG. 5 is a block diagram of an authentication device according to some example embodiments of inventive concepts.

FIG. 5 is a block diagram of an authentication device 100A according to some example embodiments of inventive concepts. Referring to FIGS. 1 through 5, the authentication device 100A includes the fingerprint acquisition region 121 and the electrodes 151 through 153 for detecting biometric data. The authentication device 100A also includes the sensor 110, the processor or a central processing unit (CPU) 210, a memory 220, a wireless communication module 230 (e.g., a transceiver or a transmitter), and a battery 240. The sensor 110 includes a fingerprint sensor 120 and the bio sensor 130.

The battery 240 may supply an operating voltage to the fingerprint sensor 120, the bio sensor 130, the processor 210, the memory 220, and the wireless communication module 230. The processor 210 may control the operation of each of the elements 110, 220, and 230 by executing computer-readable instructions stored in at least the memory 220. The fingerprint sensor 120 is connected to the fingerprint acquisition region 121. The fingerprint sensor 120 may detect a user's fingerprint and may store fingerprint data FDAT in the memory 220 or output the fingerprint data FDAT to the processor 210.

The bio sensor 130 is connected with the electrodes 151 through 153. The bio sensor 130 may detect a user's biometric data BDAT and may store the biometric data BDAT in the memory 220 or output the biometric data BDAT to the processor 210 or an external device through the wireless communication module 230. The memory 220 may be a volatile memory or a non-volatile memory. The wireless communication module 230 may communicate with an external device such as a payment terminal (850 in FIG. 11) through a WLAN like Wi-Fi, a WPAN like Bluetooth, a wireless USB, Zigbee, NFC, RFID, or a mobile cellular network. A memory (not shown) may also be included in the sensor 110 to store the fingerprint data FDAT and/or the biometric data BDAT.

Figure 6:
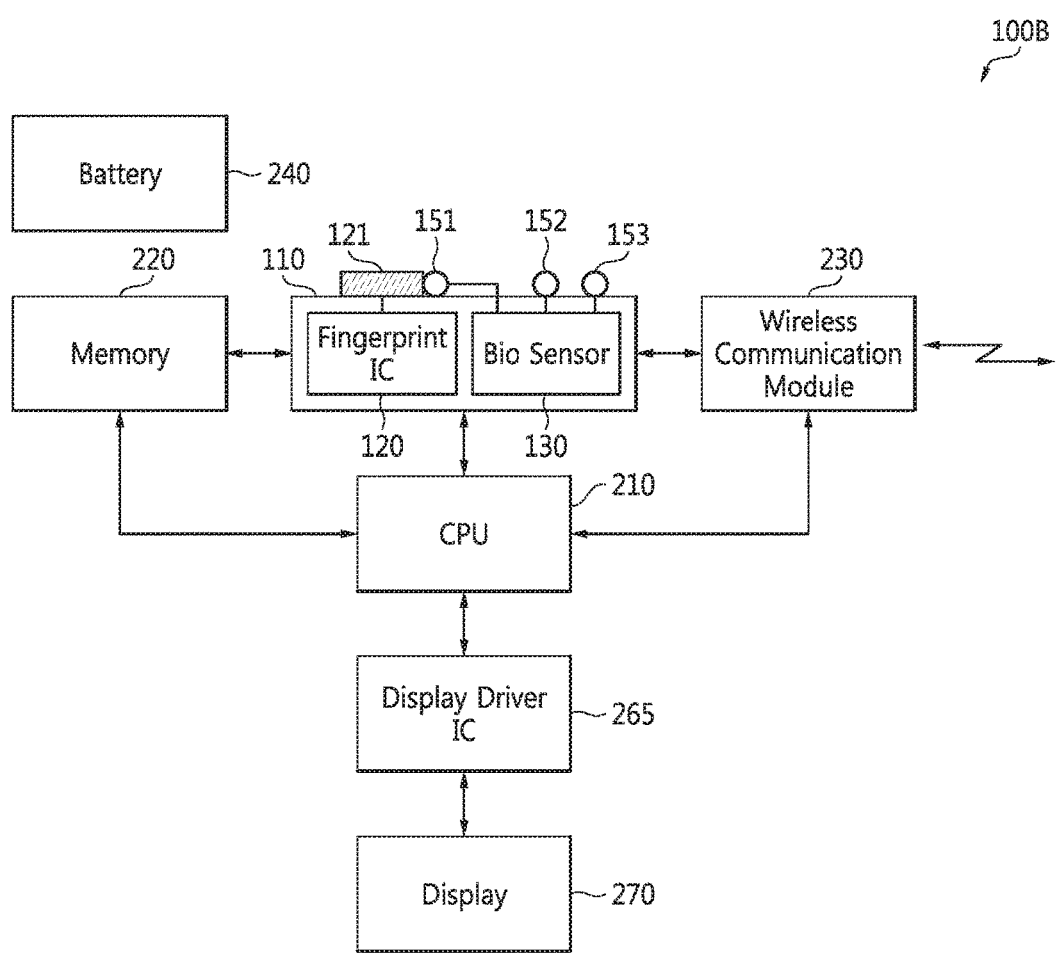
FIG. 6 is a block diagram of an authentication device according to other example embodiments of inventive concepts.

FIG. 6 is a block diagram of an authentication device 100B according to other example embodiments of inventive concepts. Referring to FIGS. 1 through 6, the authentication device 100B may include the fingerprint sensor 120 connected with the fingerprint acquisition region 121, the bio sensor 130 connected with the electrodes 151 through 153, the processor 210, the memory 220, the wireless communication module 230, the battery 240, a display driver integrated circuit (IC) 265, and a display 270.

The battery 240 may supply an operating voltage to each of the elements 110, 210, 220, 230, 265, and 270. The processor 210 may control the operation of each of the elements 110, 220, 230, 265, and 270.

The fingerprint sensor 120 is connected to the fingerprint acquisition region 121. The fingerprint sensor 120 may detect a user's fingerprint and may store the fingerprint data FDAT in the memory 220 or output the fingerprint data FDAT to the processor 210. The bio sensor 130 may output the biometric data BDAT to the processor 210. The processor 210 may transmit the biometric data BDAT to the display driver IC 265. The display driver IC 265 may display the biometric data BDAT on the display 270. The biometric data BDAT may be transmitted to an external device according to the control of the processor 210. The authentication device 100 illustrated in FIG. 1 may be the authentication device 100A or 100B illustrated in FIG. 5 or 6.

Figure 7A:
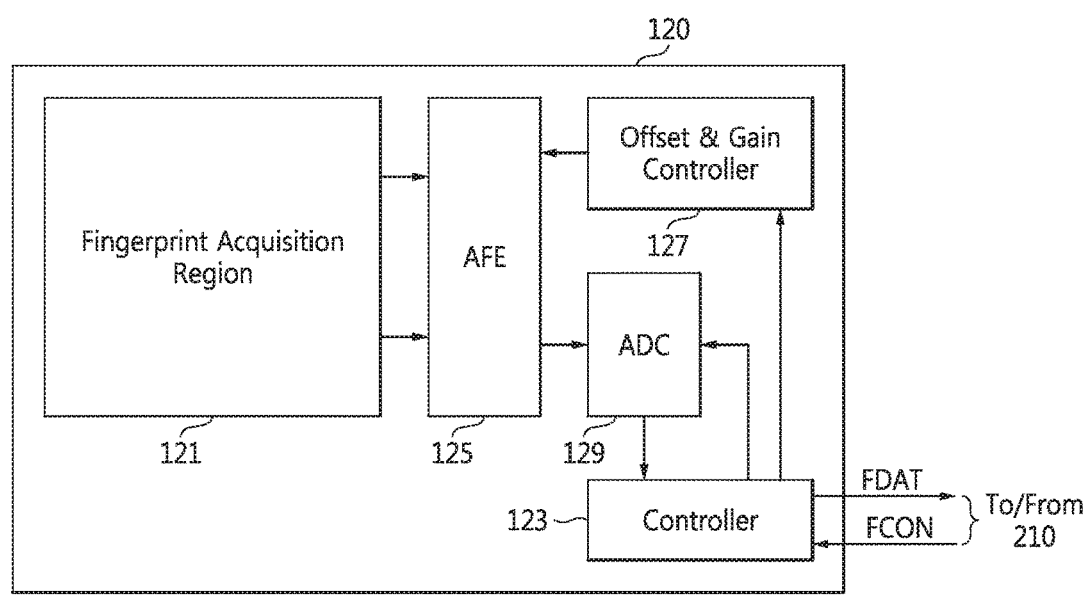
FIGS. 7A and 7B are block diagrams of a fingerprint sensor according to some example embodiments of inventive concepts.
Figure 7B:
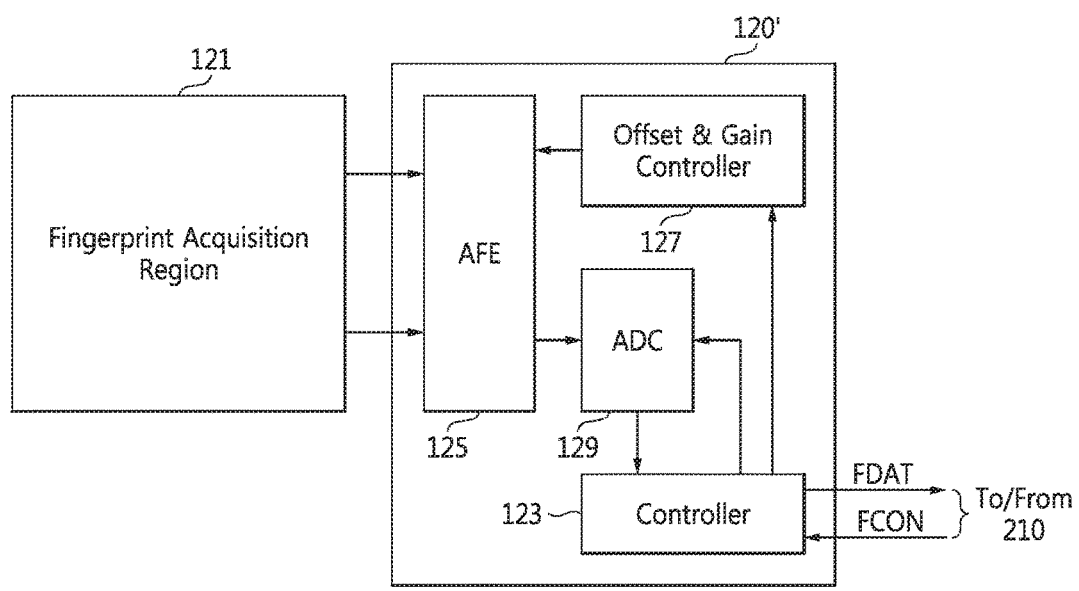

FIGS. 7A and 7B are block diagrams of the fingerprint sensor 120 according to some example embodiments of inventive concepts. Referring to FIGS. 5, 6, and 7A, the fingerprint sensor 120 includes the fingerprint acquisition region 121, a controller 123, an analog front end (AFE) circuit 125, an offset and gain controller 127, and an analog-to-digital converter (ADC) 129.

The fingerprint acquisition region 121 may include a pixel array which includes a plurality of pixels (not shown) arranged in a matrix. Each of the pixels may include a sensing electrode (not shown) which forms a capacitance with an object (e.g., a user's finger). The capacitance between the object and the sensing electrode may be different according to ridges and valleys in a user's fingerprint. Accordingly, the pixel array may generate a pixel signal based on the capacitance per pixel. A fingerprint signal may include a plurality of pixel signals output from the pixel array.

The AFE circuit 125 amplifies the fingerprint signal received through the fingerprint acquisition region 121. The AFE circuit 125 may include an amplifier (not shown) which receives and amplifies the fingerprint signal based on the capacitance. The AFE circuit 125 may reduce or remove noise from the fingerprint signal, thereby decreasing a noise index for the fingerprint signal.

The AFE circuit 125 may also remove an offset from the fingerprint signal according to the control of the offset and gain controller 127. In detail, the AFE circuit 125 may add or subtract a DC offset to or from the fingerprint signal, thereby removing the DC offset from the fingerprint signal. The AFE circuit 125 may amplify the fingerprint signal according to a gain adjusted by the offset and gain controller 127. The offset and gain controller 127 may adjust the gain and the DC offset of the AFE circuit 125 according to the control of the controller 123.

The ADC 129 may convert an analog signal processed by the AFE circuit 125 into a digital signal and may output the digital signal to the controller 123. The digital signal may be the fingerprint data FDAT.

The controller 123 may receive and process the digital signal output from the ADC 129 and may output the processed digital signal (e.g., the fingerprint data FDAT) to the processor 210 illustrated in FIG. 5 or 6. The controller 123 may control the overall operation of the fingerprint sensor 120 according to a fingerprint sensor control signal FCON output from the processor 210 illustrated in FIG. 5 or 6. The controller 123 may enable or disable the fingerprint sensor 120 according to the fingerprint sensor control signal FCON. The controller 123 may also control the gain and the DC offset, which are adjusted by the offset and gain controller 127 for the AFE circuit 125, according to the fingerprint sensor control signal FCON.

The fingerprint sensor 120 may be implemented in an IC or a system-in-package (SiP), but inventive concepts are not restricted to these examples. In the embodiments illustrated in FIG. 7A, the fingerprint acquisition region 121 is included in the fingerprint sensor 120. The fingerprint acquisition region 121 may be formed within silicon. In other words, the fingerprint sensor 120 including the fingerprint acquisition region 121 may be formed within silicon. A method of forming the fingerprint acquisition region 121 inside the fingerprint sensor 120, as shown in FIG. 7A, is referred to as a silicon method. However, inventive concepts are not restricted to the current embodiments. The fingerprint acquisition region 121 may not be included in the fingerprint sensor 120 but may be formed outside the fingerprint sensor 120, which will be described in detail with reference to FIG. 7B.

The structure and operations of a fingerprint sensor 120' illustrated in FIG. 7B are similar to those of the fingerprint sensor 120 illustrated in FIG. 7A. Thus, differences between the fingerprint sensors 120' and 120 will be mainly described to avoid redundancy.

Referring to FIG. 7B, the fingerprint acquisition region 121 is formed outside the fingerprint sensor 120'. The fingerprint sensor 120' may be implemented as a chip and the fingerprint acquisition region 121 may be formed on a substrate outside the chip of the fingerprint sensor 120'. The substrate may be a printed circuit board (PCB) or a flexible PCB (FPCB) but is not restricted thereto. A method of forming the fingerprint acquisition region 121 outside the fingerprint sensor 120' is referred to as a substrate method. However, the fingerprint sensor 120 may be formed using a method other than the silicon method and the substrate method in other embodiments.

Figure 8:
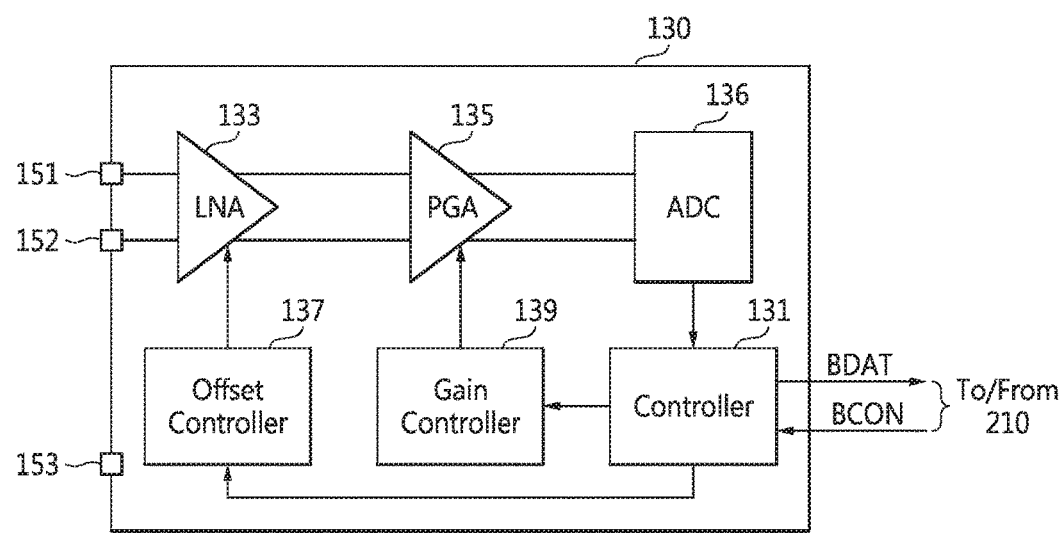
FIG. 8 is a block diagram of a bio sensor according to some example embodiments of inventive concepts.

FIG. 8 is a block diagram of the bio sensor 130 according to some example embodiments of inventive concepts. Referring to FIGS. 5, 6, and 8, the bio sensor 130 may include a controller 131, a low noise amplifier (LNA) 133, a programmable gain amplifier (PGA) 135, an ADC 136, an offset controller 137, and a gain controller 139.

The LNA 133 amplifies a biological signal received through the first and second electrodes 151 and 152. The LNA 133 may reduce or remove noise from the biological signal, thereby decreasing a noise index. The LNA 133 may amplify a difference between voltages respectively received from the first and second electrodes 151 and 152 and output an analog signal corresponding to the amplified difference to the PGA 135. The LNA 133 may also remove an offset from the biological signal according to the control of the offset controller 137. The LNA 133 may add or subtract a particular offset value to or from the biological signal, thereby removing a DC offset from the biological signal.

The PGA 135 may amplify an output signal of the LNA 133. The gain of the PGA 135 may be controlled by the gain controller 139. Accordingly, the PGA 135 may amplify the output signal of the LNA 133 according to the gain adjusted by the gain controller 139.

The electrodes 151 through 153 may be respectively connected to a plurality of pads (or pins) formed in the bio sensor 130. For example, the third electrode 153 may be connected to a ground pad (or pin) of the bio sensor 130. Since the biological signal received through the first and second electrodes 151 and 152 is very weak, it may be transformed into an analog signal at an appropriate level using the LNA 133 and the PGA 135.

The ADC 136 may convert the analog signal, which has been processed by the LNA 133 and the PGA 135, into a digital signal and output the digital signal to the controller 131. The digital signal may be data about biological information, e.g., data about an ECG or data about a BIA.

The controller 131 may process the digital signal and output the biometric data BDAT corresponding to the processing result to the processor 210 and/or the wireless communication module 230 illustrated in FIG. 5 or 6. The controller 131 may control the overall operation of the bio sensor 130 according to a bio-sensor control signal BCON output from the processor 210 illustrated in FIG. 5 or 6. The controller 131 may enable or disable the bio sensor 130 according to the bio-sensor control signal BCON. The controller 131 may also control the offset, which is adjusted by the offset controller 137, and the gain of the PGA 135, which is adjusted by the gain controller 139, according to the bio-sensor control signal BCON.

In an example embodiment, the controller 131 is configured to perform the functions described above by executing computer-readable instructions stored in a computer-readable medium (e.g., a memory). In other example embodiments, the controller 131 may include at least a portion of hardware, such as an application-specific integrated circuit (ASIC).

The bio sensor 130 may be implemented in an IC or a SiP, but inventive concepts are not restricted to these examples. In other example embodiments, the fingerprint sensor 120 and the bio sensor 130 may be implemented in one IC or SiP.

Figure 9:
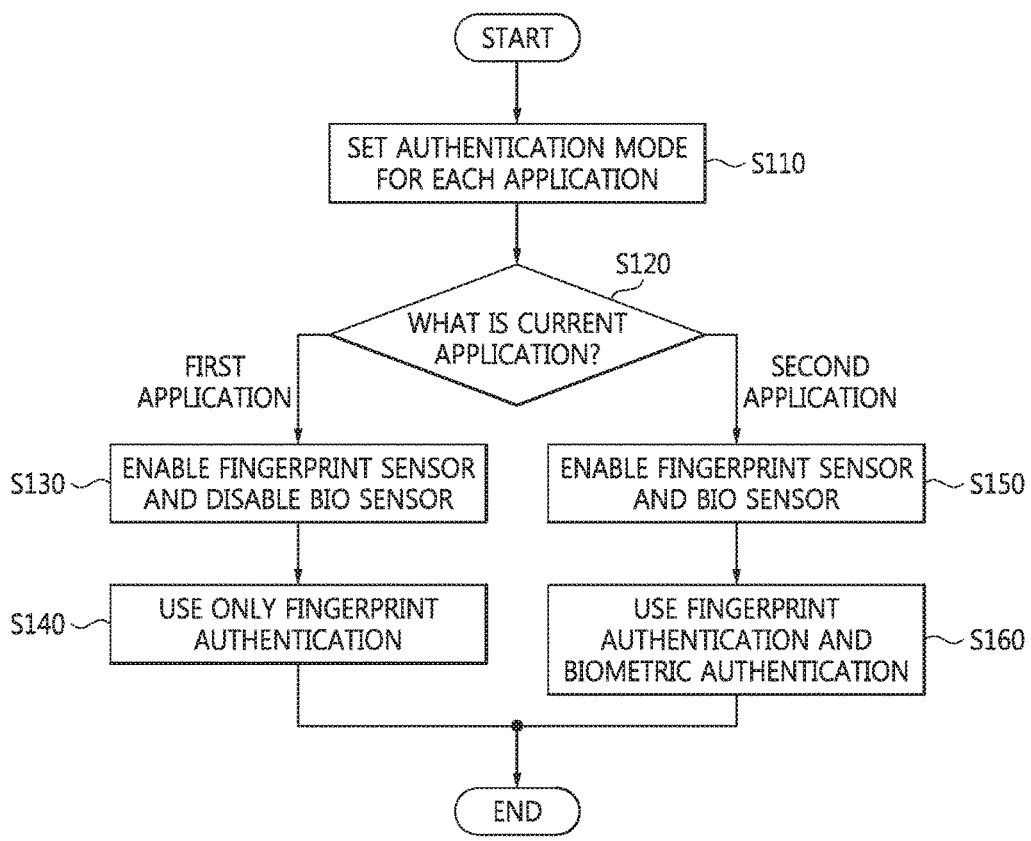
FIG. 9 is a flowchart of a method of operating an authentication device according to some example embodiments of inventive concepts.

FIG. 9 is a flowchart of a method of operating an authentication device according to some example embodiments of inventive concepts. The method may be performed by the authentication device 100A or 100B illustrated in FIG. 5 or 6.

The authentication device 100A or 100B may set an authentication mode for each application program or software (hereinafter, referred to as an "application") or for each application group according to security (i.e., the importance of security) or authentication time in operation S110. Here, the authentication time is the time taken for authentication. Biometric authentication may take longer than fingerprint authentication. For instance, a fingerprint authentication mode (i.e., a first authentication mode) may be used for a first application (e.g., unlocking); a fingerprint and biometric authentication mode (i.e., a second authentication mode) may be used for a second application (e.g., a financial or payment application). The fingerprint and biometric authentication mode uses both a fingerprint and biometric data.

The processor 210 of the authentication device 100A or 100B may set either the first authentication mode or the second authentication mode for an application requiring authentication according to security and authentication time. An authentication mode for each application or each application group may be set or changed by a user. The authentication device 100A or 100B may provide a user interface to allow a user to select the authentication mode.

Figure 10:
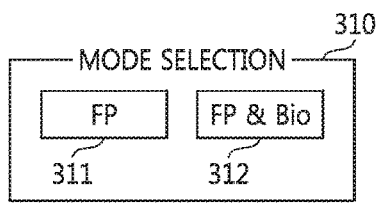
FIG. 10 is a diagram of a graphical user interface provided by a processor for selection of an authentication mode.

FIG. 10 is a diagram of a graphical user interface (GUI) 310 provided by the processor 210 for selection of an authentication mode. Referring to FIGS. 5, 6, 9, and 10, the processor 210 of the authentication device 100A or 100B may provide the GUI 310 for a user by executing instructions stored on the memory 220. The user may select the authentication mode for each application through the GUI 310. In detail, the processor 210 may provide a first GUI 311 for selecting the first authentication mode and a second GUI 312 for selecting the second authentication mode. The user can select the authentication mode for each application using the first GUI 311 or the second GUI 312.

The authentication device 100A or 100B may also set the authentication mode according to authentication time. For instance, only fingerprint authentication may be used for an application requiring short authentication time and both fingerprint authentication and biometric authentication may be used for an application which is fine with relatively long authentication time. It is assumed in the embodiments illustrated in FIG. 10 that the first authentication mode is selected for the first application and the second authentication mode is selected for the second application.

The processor 210 may control the fingerprint sensor 120 and the bio sensor 130 according to the authentication mode corresponding to a current application by executing instructions stored on the memory 220. The processor 210 may check whether the current application is the first application or the second application in operation S120. When the current application is the first application, the processor 210 may control the fingerprint sensor 120 to be enabled and the bio sensor 130 to be disabled in operation S130.

The processor 210 may authenticate the user using the fingerprint data FDAT detected by the fingerprint sensor 120 in operation S140. In detail, the processor 210 may compare the fingerprint data FDAT detected by the fingerprint sensor 120 with reference fingerprint data and authenticate a user which has been registered. The reference fingerprint data may be a user's fingerprint data which has been registered in advance.

When the current application is the second application, the processor 210 may control both the fingerprint sensor 120 and the bio sensor 130 to be enabled in operation S150. The processor 210 may control the fingerprint sensor 120 and the bio sensor 130 to be enabled at the same time or sequentially. The processor 210 may authenticate the user using both the fingerprint data FDAT detected by the fingerprint sensor 120 and the biometric data BDAT detected by the bio sensor 130 in operation S160. In detail, the processor 210 may compare the fingerprint data FDAT detected by the fingerprint sensor 120 with the reference fingerprint data and may compare the biometric data BDAT detected by the bio sensor 130 with reference biometric data to authenticate the user in operation S160. The reference fingerprint data may be a user's fingerprint data which has been registered in advance and the reference biometric data may be the user's biometric data which has been registered in advance.

Figure 11:
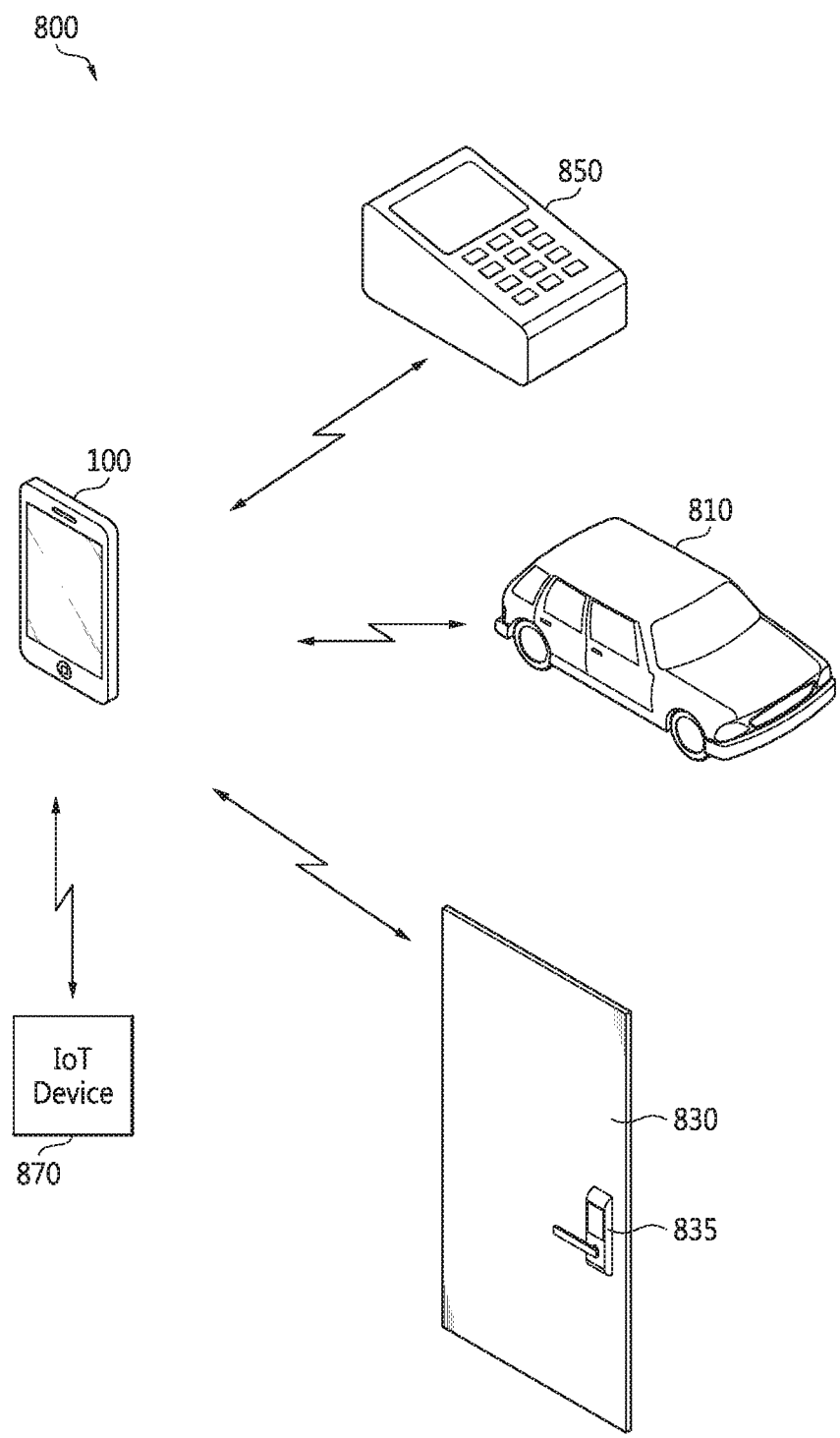
FIG. 11 is a diagram of an authentication system including the authentication device illustrated in FIG. 1 according to some example embodiments of inventive concepts.
Figure 12:
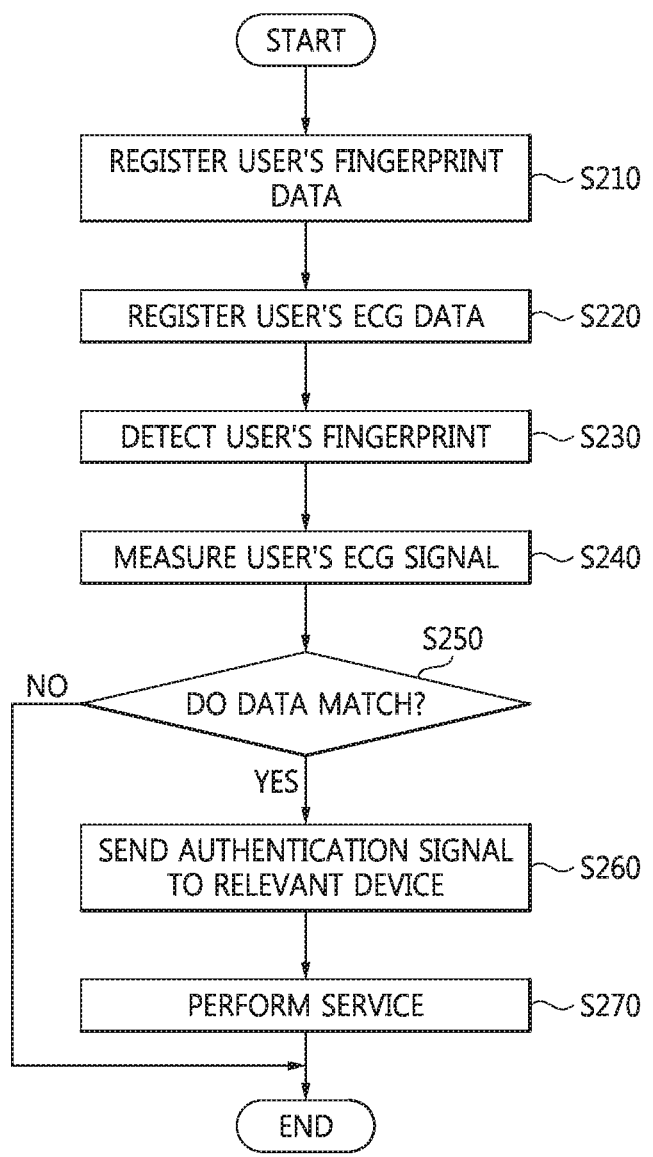
FIG. 12 is a flowchart of a method of operating the authentication system illustrated in FIG. 11 according to some example embodiments of inventive concepts.

FIG. 11 is a diagram of an authentication system 800 including the authentication device 100 illustrated in FIG. 1. FIG. 12 is a flowchart of a method of operating the authentication system 800 illustrated in FIG. 11. Referring to FIGS. 5, 6, 11, and 12, the authentication device 100 may be used as a device for mobile payment, a device for security solution, or a device for authentication solution. The authentication device 100 may communicate wireless signals with an automobile 810, a digital door lock 835, a payment terminal 850, and an IoT device 870 using the wireless communication module 230.

The processor 210 of the authentication device 100 may execute a mobile payment application program or software stored in the memory 220. It is assumed that the second authentication mode is selected for the mobile payment application program. User payment information for mobile payment may safely be stored in a secure area of the memory 220 according to the control of the processor 210. At this time, the user payment information may be encoded and stored in the secure area of the memory 220.

The mobile payment application program may perform mobile payment in association with the payment terminal 850 using the user payment information stored in the secure area of the memory 220. The user payment information may include identification information (e.g., credit card information, password, fingerprint data, and biometric data) by which an authentic user of the authentication device 100 is identified. The identification information may be registered in the secure area of the memory 220 by the authentic user of the authentication device 100 using the mobile payment application program.

The fingerprint sensor 120 may detect a fingerprint of a user contacting the fingerprint acquisition region 121 and may send the fingerprint data FDAT corresponding to the fingerprint to the processor 210. The processor 210 may store the fingerprint data FDAT received from the fingerprint sensor 120 in the secure area of the memory 220 in operation S210. In other words, the authentication device 100 stores the fingerprint data FDAT in the secure area of the memory 220 to register the fingerprint data FDAT as the user's. The fingerprint data FDAT that has been registered may be used as the reference fingerprint data.

The bio sensor 130 may measure the user's biological signal (e.g., an ECG signal) using the electrodes 151 through 153 and may output the biometric data BDAT corresponding to the measured biological signal to the processor 210. The processor 210 may store the biometric data BDAT received from the bio sensor 130 in the secure area of the memory 220 in operation S220. In other words, the authentication device 100 may store the biometric data BDAT in the secure area of the memory 220 to register the user's biometric data BDAT. The biometric data BDAT that has been registered may be used as the reference biometric data.

When the user applies for user authentication for mobile payment, the processor 210 may enable both the fingerprint sensor 120 and the bio sensor 130 at the same time or sequentially. The fingerprint sensor 120 may detect a fingerprint of a user contacting the fingerprint acquisition region 121 and may send the fingerprint data FDAT corresponding to the fingerprint to the processor 210 in operation S230. The bio sensor 130 may measure a biological signal (e.g., an ECG signal) using the electrodes 151 through 153 and may output the biometric data BDAT corresponding to the ECG signal to the processor 210 in operation S240.

The mobile payment application program executed in the processor 210 may compare the reference fingerprint data stored or registered in the secure area of the memory 220 with the fingerprint data FDAT generated by the fingerprint sensor 120 in operation S250. The mobile payment application program may also compare the reference biometric data stored or registered in the secure area of the memory 220 with the biometric data BDAT generated by the bio sensor 130 in operation S250.

When the fingerprint data FDAT matches the reference fingerprint data and the biometric data BDAT matches the reference biometric data (i.e., in case of YES) in operation S250, the mobile payment application program may generate an authentication signal indicating a match. The processor 210 may transmit the authentication signal to a device, e.g., the payment terminal 850 through the wireless communication module 230 in operation S260. The payment terminal 850 may provide a mobile payment service for the user of the authentication device 100 in operation S270.

The authentication device 100 may be used to authenticate the user. At this time, the authentication signal output from the processor 210 may be transmitted to a relevant device (e.g., the automobile 810, the digital door lock 835, or the IoT device 870) through the wireless communication module 230 in operation S260.

A door key control device of the automobile 810 may unlock the door of the automobile 810 in response to the authentication signal. The digital door lock 835 installed at a door 830 may release a lock in response to the authentication signal. The IoT device 870 requiring authentication or security may provide a service in response to the authentication signal in operation S270. When the IoT device 870 is a wireless access point, the wireless access point may connect the authentication device 100 to the internet in response to the authentication signal.

The execution order of operations S210 through S270 illustrated in FIG. 12 may be changed in other example embodiments. At least two operations among these operations S210 through S270 may be performed in parallel.

As described above, according to some example embodiments of inventive concepts, both fingerprint data and biometric data are used, so that defense against fake fingerprints is increased and the security of an authentication device is enhanced.

While inventive concepts have been particularly shown and described with reference to example embodiments thereof, it will be understood by those of ordinary skill in the art that various changes in forms and details may be made therein without departing from the spirit and scope of inventive concepts as defined by the following claims.

What is claimed is:

1. A sensor comprising:
   a fingerprint sensor configured to detect fingerprint data of a user contacting a fingerprint acquisition region;
   a plurality of electrodes; and
   a bio sensor connected to the plurality of electrodes to detect at least one type of biometric data other than fingerprint data,
   wherein
   a first electrode among the plurality of electrodes is located such that a finger of the user contacts the first electrode and the fingerprint acquisition region together when the finger of the user is in contact with the fingerprint acquisition region,
   the sensor is configured to operate based on an authentication mode selected according to at least one of a security level or an authentication time for respective applications or groups of applications, including a first authentication mode for a first application or first group of applications and a second authentication mode for a second application or second group of applications having a higher security level than the first application or first group of applications,
   in response to the selected authentication mode for a current application being the first authentication mode, the fingerprint sensor is enabled and the bio sensor is disabled by a processor such that the sensor is configured to selectively use only the fingerprint sensor and not the bio sensor to authenticate the user based on only the fingerprint data, and
   in response to the selected authentication mode for the current application being the second authentication mode, both the fingerprint sensor and the bio sensor are enabled by the processor such that the sensor is configured to use both the fingerprint sensor and the bio sensor to authenticate the user based on both the fingerprint data and the biometric data.

2. The sensor of claim 1, wherein
   the finger of the user is on a first hand of the user and the first electrode is configured to be in contact with the finger of the first hand of the user, and
   at least a second electrode and a third electrode among the plurality of electrodes are configured to be in contact with respective portions of a second hand of the user, the first hand and the second hand being different.

3. The sensor of claim 1, wherein the biometric data is at least one of an electrocardiogram (ECG) signal, a bioelectrical impedance analysis (BIA) signal, a human body fat, a temperature, and a heart rate.

4. The sensor of claim 1, wherein the sensor is configured to transmit at least one among the fingerprint data, the biometric data, and an authentication signal to an external device.

5. The sensor of claim 4, further comprising:
   a memory configured to store reference fingerprint data of the user and reference biometric data of the user,
   wherein the sensor is configured to compare the fingerprint data with the reference fingerprint data to generate the authentication signal in the first authentication mode, and to compare the fingerprint data with the reference fingerprint data and compare the biometric data with the reference biometric data to generate the authentication signal in the second authentication mode.

6. A mobile device comprising:
a fingerprint sensor configured to detect fingerprint data of a user contacting a fingerprint acquisition region, the fingerprint acquisition region having a circuit configured to acquire a fingerprint of a finger of the user;
a plurality of electrodes;
a bio sensor connected to the plurality of electrodes to detect at least one type of biometric data other than fingerprint data; and
a processor configured to execute computer-readable instructions to control the bio sensor and the fingerprint sensor, and to use at least one of the fingerprint sensor and the bio sensor based on an authentication mode selected according to at least one of a security level and an authentication time for respective applications or groups of applications of the mobile device, wherein
the processor is configured to enable the fingerprint sensor and disable the bio sensor so as to selectively use only the fingerprint sensor and not the bio sensor to authenticate the user based on only the fingerprint data in a first authentication mode for a first application or first group of applications, and
the processor is configured to enable both the fingerprint sensor and the bio sensor so as to use both the fingerprint sensor and the bio sensor to authenticate the user based on both the fingerprint data and the biometric data in a second authentication mode for a second application or second group of applications having a higher security level than the first application or first group of applications.

7. The mobile device of claim 6, wherein a first electrode of the plurality of electrodes contacts the finger of the user when the finger of the user is in contact with the fingerprint acquisition region.

8. The mobile device of claim 7, wherein one or more electrodes of the plurality of electrodes are located at a first side or a second side of the mobile device.

9. The mobile device of claim 8, wherein
the first electrode is located to be in contact with a first hand of the user, and
the one or more electrodes are located to be in contact with a portion of the user other than the first hand of the user, the finger of the user being on the first hand.

10. The mobile device of claim 8, wherein
the first electrode is located at a front surface or a rear surface of the mobile device, and
the one or more electrodes include at least a second electrode located at the first side of the mobile device, and a third electrode located at the second side of the mobile device.

11. The mobile device of claim 6, wherein the processor is configured to execute the computer-readable instructions to provide a graphical user interface to enable the user to select the authentication mode for the respective applications or groups of applications of the mobile device.

12. The mobile device of claim 6, further comprising:
a wireless communication transceiver configured to transmit at least one among the fingerprint data, the biometric data, and an authentication signal to an external device; and
a memory configured to store reference fingerprint data of the user and reference biometric data of the user,
wherein the processor is configured to execute the computer-readable instructions to compare the fingerprint data with the reference fingerprint data to generate the authentication signal in the first authentication mode, and to compare the fingerprint data with the reference fingerprint data and compare the biometric data with the reference biometric data to generate the authentication signal in the second authentication mode.

13. An authentication device comprising:
a fingerprint sensor configured to detect fingerprint data of a user contacting a fingerprint acquisition region;
a plurality of electrodes;
a bio sensor connected to the electrodes to detect at least one type of biometric data other than fingerprint data, wherein the plurality of electrodes are arranged to form a closed loop with a user upon being contacted by the user; and
a processor configured to execute computer-readable instructions to control the bio sensor and the fingerprint sensor, and to use at least one of the fingerprint sensor and the bio sensor based on an authentication mode selected according to at least one of a security level and an authentication time for respective applications or groups of applications of the authentication device, wherein
the processor is configured to enable the fingerprint sensor and disable the bio sensor so as to selectively use only the fingerprint sensor and not the bio sensor to authenticate the user based on only the fingerprint data in a first authentication mode for a first application or first group of applications, and
the processor is configured to enable both the fingerprint sensor and the bio sensor so as to use both the fingerprint sensor and the bio sensor to authenticate the user based on both the fingerprint data and the biometric data in a second authentication mode for a second application or second group of applications having a higher security level than the first application or first group of applications.

14. The authentication device of claim 13, wherein the plurality of electrodes includes,
a first electrode at a front surface of the authentication device with respect to the user,
a second electrode at a first side of the authentication device,
a third electrode at a second side of the authentication device, the front surface, the first side and the second side being different.

15. The authentication device of claim 14, wherein the first electrode is closer to the fingerprint sensor than the second electrode and the third electrode.

16. The authentication device of claim 13, wherein the plurality of electrodes includes,
a first electrode at a rear surface of the authentication device with respect to the user,
a second electrode at a first side of the authentication device,
a third electrode at a second side of the authentication device, the rear surface, the first side and the second side being different.

17. The authentication device of claim 16, wherein the first electrode is closer to the fingerprint sensor than the second electrode and the third electrode.

18. The authentication device of claim 13, wherein the processor is configured to execute the computer-readable instructions to provide a graphical user interface to enable the user to select the authentication mode for the respective applications or groups of applications of the authentication device.

19. The authentication device of claim 13, further comprising:

a memory configured to store reference fingerprint data of the user and reference biometric data of the user, wherein the processor is configured to execute the computer-readable instructions to compare the fingerprint data with the reference fingerprint data to generate an authentication signal in the first authentication mode, and to compare the fingerprint data with the reference fingerprint data and compare the biometric data with the reference biometric data to generate the authentication signal in the second authentication mode.

* * * * *